(12) United States Patent
Forster

(10) Patent No.: US 11,580,316 B2
(45) Date of Patent: Feb. 14, 2023

(54) INTERACTING RFID TAGS

(71) Applicant: AVERY DENNISON RETAIL INFORMATION SERVICES LLC, Mentor, OH (US)

(72) Inventor: Ian Forster, Chelmsford (GB)

(73) Assignee: Avery Dennison Retail Information Services LLC, Menter, OH (US)

( * ) Notice: Subject to any disclaimer, the term of this patent is extended or adjusted under 35 U.S.C. 154(b) by 0 days.

(21) Appl. No.: 16/678,129

(22) Filed: Nov. 8, 2019

(65) Prior Publication Data
US 2020/0151403 A1 May 14, 2020

Related U.S. Application Data

(60) Provisional application No. 62/757,387, filed on Nov. 8, 2018.

(51) Int. Cl.
*G06K 7/10* (2006.01)
*G06K 19/077* (2006.01)

(52) U.S. Cl.
CPC ... *G06K 7/10297* (2013.01); *G06K 19/07786* (2013.01)

(58) Field of Classification Search
CPC .................................................. G06K 7/10297
USPC ....................................................... 235/451
See application file for complete search history.

(56) References Cited

U.S. PATENT DOCUMENTS

| | | | |
|---|---|---|---|
| 6,150,921 A | 11/2000 | Werb | |
| 2005/0156709 A1 | 7/2005 | Gilbert et al. | |
| 2008/0318625 A1* | 12/2008 | Rofougaran | G06F 3/0346 |
| | | | 455/556.1 |
| 2010/0127084 A1* | 5/2010 | Pavate | G06K 19/07749 |
| | | | 235/492 |
| 2010/0328047 A1 | 12/2010 | Jantunen et al. | |
| 2011/0285511 A1 | 11/2011 | Maguire et al. | |

(Continued)

FOREIGN PATENT DOCUMENTS

| | | |
|---|---|---|
| EP | 2811426 | 10/2015 |
| NO | 20141464 | 10/2015 |

OTHER PUBLICATIONS

International Search Report and Written Opinion dated Apr. 29, 2020 issued in corresponding IA No. PCT/US2019/060419.

(Continued)

*Primary Examiner* — Allyson N Trail

(57) ABSTRACT

An active radio frequency identification ("RFID") tag receives an RFID interrogation signal via a first antenna. An integrated frequency reference in the RFID chip recovers the clock from the RFID interrogation and generates a reference clock for transmitting data responsive to the RFID interrogation. The integrated frequency reference generates the reference clock at the same frequency as the RFID interrogation for transmitting the response via the first antenna. The integrated frequency reference generates the reference clock at a different frequency for transmitting the response using a Bluetooth beacon message or a WiFi message via a second antenna. A mobile computing device can interrogate the RFID tag via an NFC interface and receive a response via a Bluetooth beacon messages or WiFi message received via a Bluetooth or wireless interface of the mobile computing device.

17 Claims, 2 Drawing Sheets

(56) References Cited

U.S. PATENT DOCUMENTS

| | | | |
|---|---|---|---|
| 2013/0243436 A1* | 9/2013 | Kargl | H04B 10/1143 |
| | | | 398/115 |
| 2016/0301516 A1* | 10/2016 | Marek | H04W 52/02 |
| 2017/0019765 A1* | 1/2017 | Hoyer | H04W 4/021 |
| 2019/0143205 A1* | 5/2019 | Takahashi | A63F 13/23 |
| | | | 463/37 |

OTHER PUBLICATIONS

International Preliminary Report on Patentability dated May 11, 2021 issued in corresponding IA No. PCT/US2019/060419.

* cited by examiner

INTERACTING RFID TAGS

CROSS REFERENCE TO RELATED APPLICATION(S)

The present application claims priority from and the benefit of U.S. provisional utility patent application No. 62/757,387 filed Nov. 8, 2018, which is incorporated herein by reference in its entirety.

TECHNICAL FIELD

The subject application generally relates to radio frequency identification ("RFID") tags and, more specifically, to RFID tags configured to recover clocking from a received signal and generate an internal reference clock for transmitting data at a desired frequency.

BACKGROUND

Radio frequency systems, such as Near Field Communication ("NFC") and Radio Frequency Identification ("RFID") systems, allow consumers to use smartphones, or other transceivers, to receive messages from nearby radio frequency tags. Such tags can allow consumers to receive targeted marketing and discount information, access websites of interest, provide store or venue location information, register the consumer's presence in the store or venue, and automatically sign consumers into local WiFi networks, among other suitable operations customizable for the particular store or venue.

Radio frequency tags can operate in the High Frequency ("HF") range and Ultra High Frequency ("UHF") range. RFID tags include a chip that is coupled to a suitable antenna, such as a coil antenna for RFID systems that operate in the HF range. The RFID tag receives power when excited by a nearby electromagnetic field emitted the resonant frequency of the RFID tag. Once the chip has received sufficient power, (e.g., 10 μW), the chip turns on and transmits a coded return signal or message via the coil antenna. For NFC tags, a capable smartphone can receive and decode the coded return signal from the RFID tag, and interpret the message to enable the operations described above. Active RFID tags can include power sources such as batteries that enable operation in the UHF range with increased range and bandwidth capabilities.

SUMMARY

According to certain embodiments, an active RFID tag includes an antenna that receives a first radio frequency signal such as an RFID interrogation signal and an integrated frequency reference that recovers clocking from the radio frequency signal and generates a reference clock for transmitting data as a second radio frequency signal.

In certain other embodiments, an active RFID tag includes a first antenna, an RFID chip electrically coupled to the first antenna, an internal frequency reference integrated into the RFID chip that is configured to recover a clock signal from a first radio signal received on the first antenna for transmitting a second a second radio signal, and a power source for the RFID chip for transmitting the second radio signal in response to receiving the first radio signal.

According to yet other embodiments, a method includes receiving, by an RFID chip, an interrogation signal, recovering a clock signal from the interrogation signal by an frequency reference integrated into the RFID chip, generating a reference clock for transmitting response data in response to the interrogation signal, and transmitting the response data using the frequency of the reference clock.

BRIEF DESCRIPTION OF THE DRAWINGS

Various embodiments will become better understood with regard to the following description, appended claims, and accompanying drawings.

DETAILED DESCRIPTION

The systems and methods disclosed herein are described in detail by way of examples and with reference to FIGS. 1 to 6. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The systems and methods disclosed herein describe new modalities of communication for active tags using Near Field Communication ("NFC"), Radio Frequency Identification ("RFID"), Bluetooth, and WiFi or IEEE 802.11 wireless transmission protocols. Although the systems and methods described herein are particularly applicable to active tags that include NFC, RFID, Bluetooth, or WiFi communication capabilities, the disclosed structures and methodologies can be adapted for use with other types of wireless tags and wireless protocols. For example, Electronic Article Surveillance ("EAS") systems use High Frequency ("HF") radio waves, nominally at 8.2 MHz, and use similar coil antennas as passive RFID tags and can be adapted for use in active tags.

Figure 1:
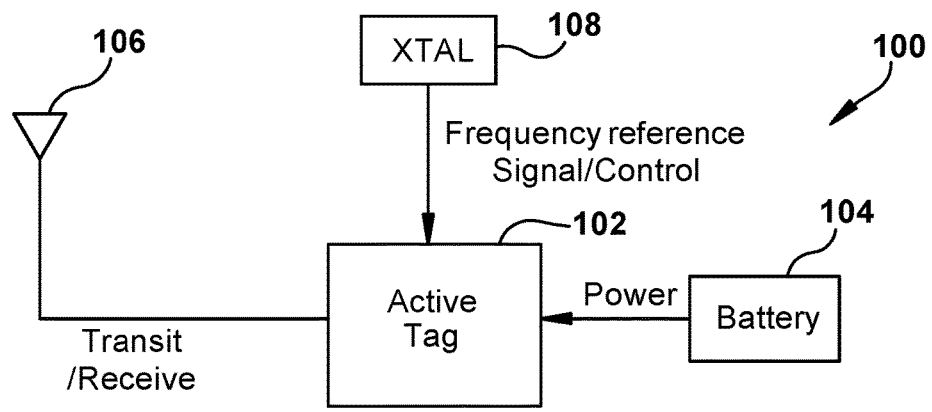
FIG. 1 depicts an embodiment of an active tag.

Referring to FIG. 1, an embodiment of an active tag 100 is presented. The active tag 100 includes circuitry 102, a power source 104, one or more antennas 106, and an external frequency reference 108 such as a crystal as shown. The circuitry 102 includes components for supporting active transmission of signals as would be understood in the art. For example, the circuitry 102 can include components such as a receiver, a transmit amplifier, a frequency synthesizer, a memory, a processor, and other components as would be understood in the art. In configurations, the active tag 100 operation can be unidirectional, for example transmit only, or bidirectional including both transmit and receive capabilities.

An active tag 100 is powered by a power source 104, for example a battery that uses a chemical reaction to generate power. In certain embodiments, the power source 104 can be a harvesting system that converts power from available sources, for example a solar cell that generates power from light, piezoelectric devices that generate power when flexed or vibrated, thermal generators, or devices that capture energy via the antenna 106 from radio frequency emitters. Example energy harvesting systems can be found in U.S. Patent Application No. 62/673,360 which is hereby incorporated by reference in its entirety.

To reduce the size of the active tag 100, the circuitry 102 can be constructed on a single semiconductor chip. Generally, the antenna 106 and the external frequency reference 108 are separate components from the circuitry 102, as it can be difficult to incorporate these devices with the rest of the circuitry 102 on a semiconductor chip. Electrical connections connect the circuitry 102 with the antenna 106 and the external frequency reference 108. For example, an RFID chip can be disposed on a strap for facilitating electrical connections to antennas and other components.

An external frequency reference 108 can be used to generate the desired frequency of radio frequency signals used for a particular application. For example, 860 MHz to 960 MHz signals are commonly used for RFID tags. In another example, 2.4 GHz and 5 GHz radio frequency signals are used for WiFi and IEEE 802.11 standards. Bluetooth and ISM (industrial, scientific and medical) short-range radio frequency communications typically use 2.45 GHz signals. Near Field Communications (NFC) use 13.56 MHz signals.

Example external frequency references 108 include, but are not limited to a crystal such as a quartz crystal, a ceramic resonator, or a surface acoustic wave device. External frequency references 108 increase the cost of manufacturing active tags 100, increase manufacturing complexity, and add a potential point of failure to the active tag 100. Eliminating the need for a separate external frequency reference 108 in an active tag 100 can reduce costs and improve reliability, in addition to providing new modalities of operation.

Figure 2:
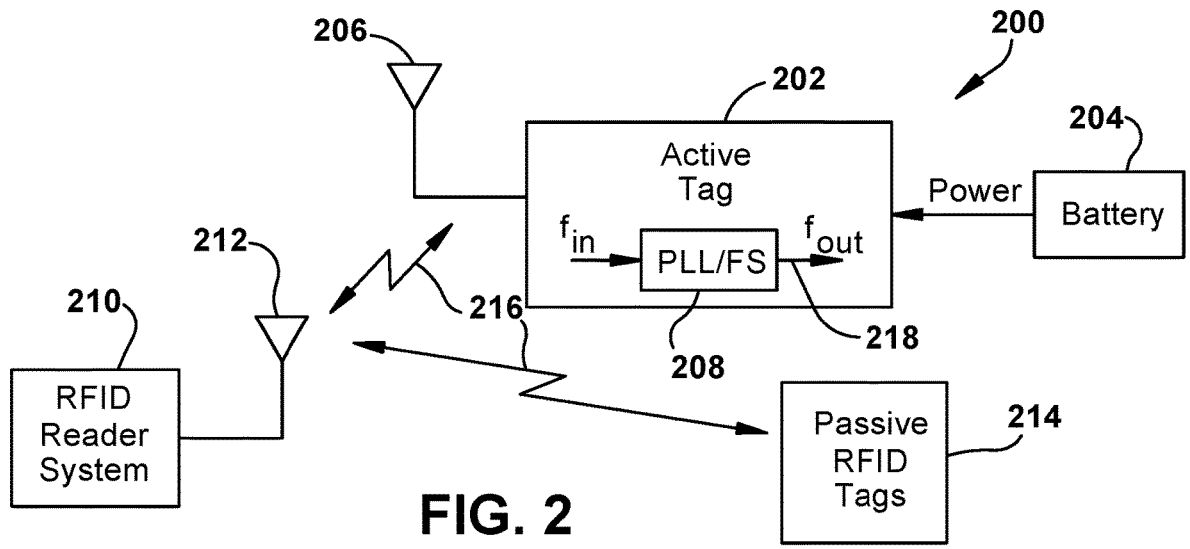
FIG. 2 depicts an embodiment of an active tag configured to recover a clock signal from a received signal.

Referring now to FIG. 2, presented is an embodiment of a system 200 that includes an active tag 202, an RFID reader 210, and an optional passive tag 214. The active tag 202 includes an internal integrated frequency reference 208 that recovers a clock signal from the RFID signal 216. The integrated frequency reference 208 is configured to recover the clock signal from an RFID signal 216, such as an RFID interrogation signal from the RFID reader 210. The integrated frequency reference 208 can recover the clock from a carrier signal of the RFID signal 216 or from the data of the RFID signal 216. The integrated frequency reference 208 recovers the clock and generates an internal reference clock that the active tag 202 can use for transmitting data at the same frequency or a different frequency as the received RFID signal 216.

For example, when the RFID reader 210 interrogates nearby RFID devices, such as active tag 202 and passive tag 214, the RFID reader 210 sends a relatively simple RFID signal 216. The RFID signal 216 can be an amplitude modulated signal that includes data suitably encoded in a standard format such as FM0 or Manchester Bi-Phase among other suitable encoding formats. The RFID signal 216 includes a clock signal that is related to the data rate. The data rate is locked to an internal accurate reference clock in the RFID reader 210, for example the quartz crystal of FIG. 1, that serves to stabilize the frequency of the RFID signal 216 sent by the RFID reader 210 to a specific standard. For example, the RFID reader 210 can be configured to use the 2.4 GHz ISM band for RFID signaling.

The active tag 202 receives the RFID signal 216 from the RFID reader 210. The integrated frequency reference 208 recovers the clock from the RFID signal 216 and generates a reference clock 218 that is used by the active tag 202 to transmit data. The integrated frequency reference 208 can include any suitable components and circuitry for recovering the clock from the RFID signal 216 and generating the reference clock 218. For example, the integrated frequency reference 208 can include a phase locked loop circuit for recovering the clock and a frequency synthesizer circuit for generating the reference clock 218. In certain configurations, the frequency, $f_{out}$, of the reference clock 218 can be same frequency, $f_{in}$, of the RFID signal 216. In certain configurations, the frequency, $f_{out}$, of the reference clock 218 can be a different frequency than the frequency, $f_{in}$, of the RFID signal 216.

Advantageously, because the integrated frequency reference 208 generates a reference clock 218 from the RFID signal 216, the active tag 202 does not require a separate external frequency reference such as the quartz crystal of FIG. 1. Eliminating the need for a separate external frequency reference in an active tag 202 can reduce the cost and complexity of the active tag 202.

Figure 3:
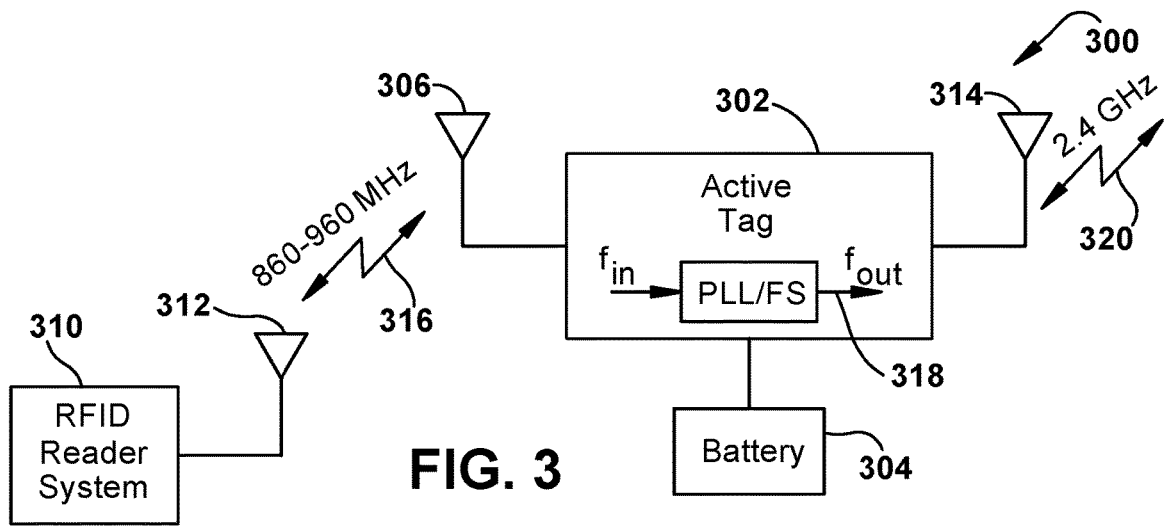
FIG. 3 depicts an embodiment of an active tag that generates a new signal using a recovered clock signal.

Referring now also to FIG. 3, presented is an embodiment of a system 300 that includes an active tag 302 configured to operate on different frequencies. The active tag 302 receives power from a suitable power source 304, such as a battery. The active tag 302 receives an RFID signal 316 from the RFID reader 310 on a first antenna 306 that is configured to receive signals on the 860 MHz to 960 MHz band. The integrated frequency reference 308 recovers the clock from the RFID signal 316 at a first frequency, $f_{in}$, which is in the 860 MHz to 960 MHz band for RFID systems, and generates a reference clock 318, at a second frequency $f_{out}$, for transmitting on the 2.4 GHz WiFi band. The active tag 302 generates suitably encoded data for a WiFi signal 320. The active tag 302 then transmits the WiFi signal 320 on the second antenna 314 which is configured to transmit signals on the 2.4 GHz WiFi band. As would be appreciated, although the example system 300 is described with regard to RFID signals 316 and WiFi signals 320, the active tag 302 can be configured to use any suitable signals or range of signals as would be understood in the art.

Figure 4:
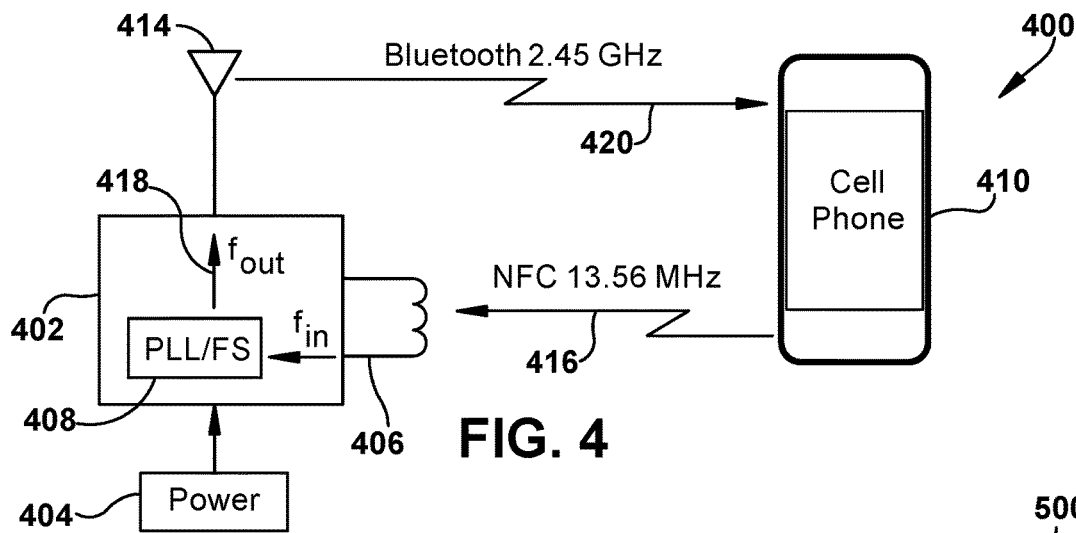
FIG. 4 depicts an embodiment of an active tag that generates a new signal using a recovered clock signal from a near field communication signal.

Referring now also to FIG. 4, presented is an embodiment of a system 400 that includes an active tag 402 configured to communicate with a mobile computing device 410, such as a cell phone, via a direct connection. The active tag 402 receives an NFC signal 416 from the mobile computing device 410 on a first antenna 406, for example an HF coil antenna as illustrated, that is configured to receive 13.56 MHz NFC signals 416. The integrated frequency reference 408 recovers the clock from the 13.56 MHz ($f_{in}$) NFC signal 416 and generates a reference clock 418 for transmitting a 2.45 GHz ($f_{out}$) Bluetooth signal 420. The active tag 402 generates suitably encoded data for the Bluetooth signal 420. For example, the Bluetooth signal 420 can be encoded as a Bluetooth beacon formatted message. The active tag 402 then transmits the Bluetooth signal 420 on the second antenna 414 which is configured to transmit signals on the 2.45 GHz band used for Bluetooth communications.

In certain embodiments, the active tag 402 is configured to be disposed on an item of clothing, a product, or infrastructure, for example in a retail environment. When a mobile computing device 410 approaches the active tag 402, the active tag 402 receives the NFC signal 416 from the mobile computing device 410 and in response transmits a Bluetooth signal 402, for example a Bluetooth beacon message. The mobile computing device 410 can receive the Bluetooth signal 402 and perform an action in response. For example, the Bluetooth signal 420 can include a link to direct the mobile computing device 410 to retrieve and display an advertisement or coupon to the user.

The active tag 402 can receive power from a suitable power source 404, such as a battery or an energy harvesting system as described above. In certain embodiments an active tag 402 can be configured to recover an NFC signal 416 at a greater distance that the typical range of a standard NFC tag. While standard NFC tags operate at a distance of approximately 50 mm, the active tag 402 and the mobile computing device 410 can be configured such that the active tag 402 functions as an extended range NFC tag. By receiving data via the NFC signal 416 but transmitting data back to mobile computing device 410 via a Bluetooth signal 420, the active tag 402 be read at a distance of approximately 1 meter or more. In certain embodiments, the mobile computing device 410 can be configured so that communications appear to be standard NFC communications to other software that is executing on the mobile computing device 410. In this way, the process of transmitting via NFC signals 416, but receiving via Bluetooth signals 420, is transparent to the other software executing on the mobile computing device 410.

Figure 5:
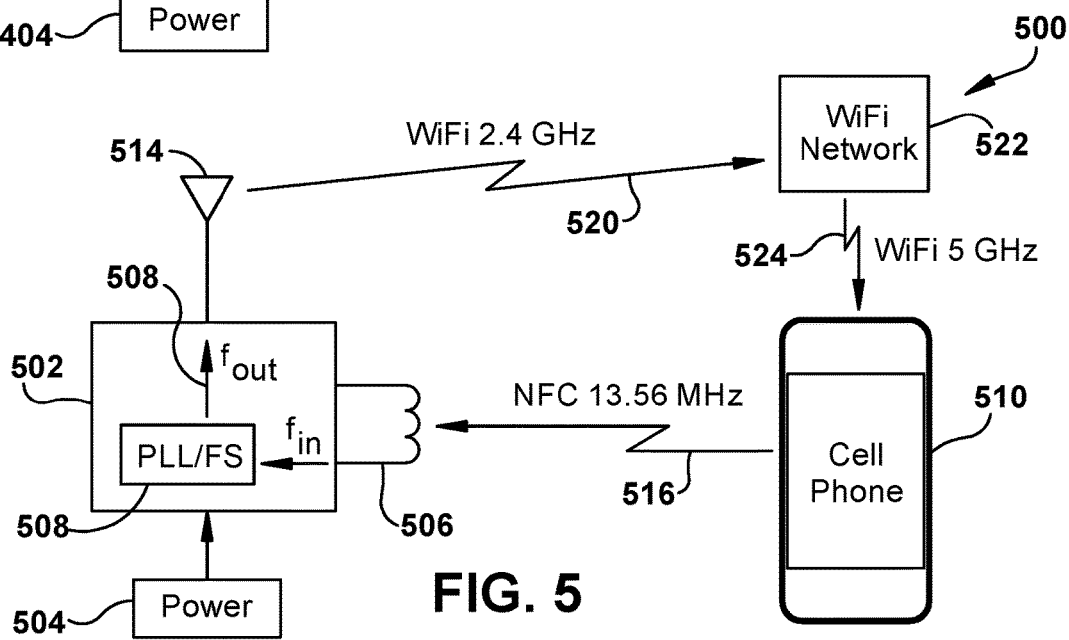
FIG. 5 depicts an embodiment of an active tag that transmits data via a network after receiving a near field communication signal.

Referring now also to FIG. 5, presented is an embodiment of a system 500 that includes an active tag 502 configured to communicate with a mobile computing device 510 via an indirect link over a separate network. As described above, the active tag 502 can receive power from a suitable power source 504. The active tag 502 receives an NFC signal 516 from the mobile computing device 510 on a first antenna 506, for example an inductive loop, that is configured to receive 13.56 MHz NFC signals 516. The integrated frequency reference 508 recovers the clock from the 13.56 MHz ($f_{in}$) NFC signal 516 and generates a reference clock 518 for transmitting via WiFI at 2.4 GHz ($f_{out}$). The active tag 502 generates suitably encoded data for a WiFi message 520. The active tag 502 then transmits the WiFi message 520 via the second antenna 514 which is configured to transmit signals on the 2.4 GHz WiFi band. The WiFi message 520 is received by a local WiFi network 522 which is wirelessly connected to both the active tag 502 and the mobile computing device 510. The WiFi network 522 routes the WiFi message 520 internally between routing devices and transmits the WiFi message 520 to the mobile computing device 510 over another WiFi link, for example a 5 GHz WiFi connection 524 that is established between the WiFi network 522 and the mobile computing device 510. As would be appreciated, the active tag 502, mobile computing device 510, and WiFi network 522 can be configured to use 2.4 GHz or 5 GHz or any other suitable wireless speeds or IEEE 802.11 protocols as would be understood in the art.

Figure 6:
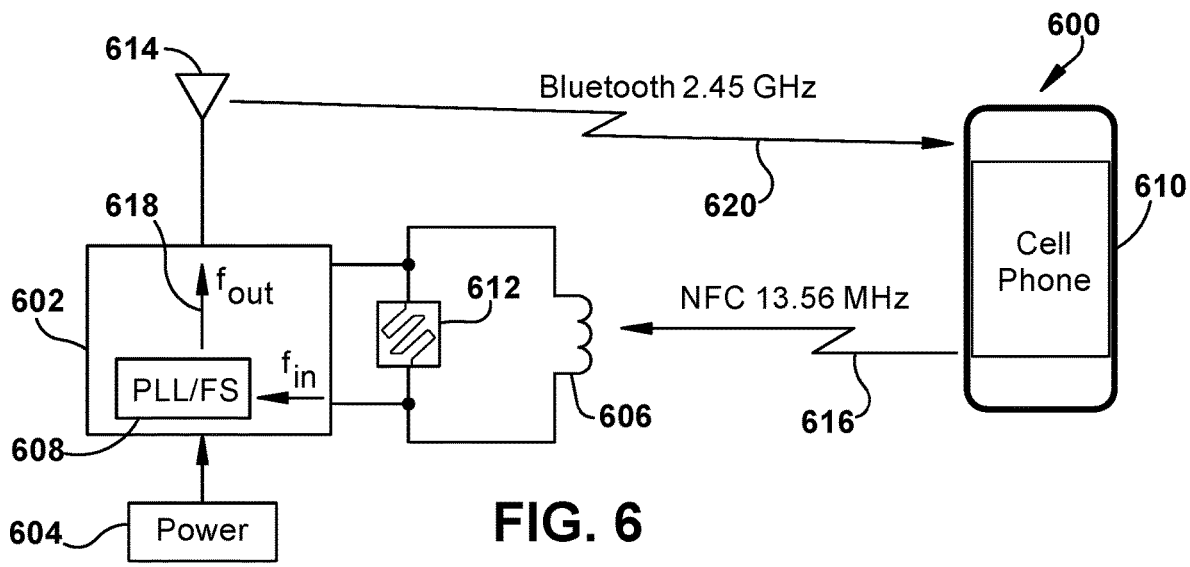
FIG. 6 depicts an embodiment of an active tag that includes selective near field communication capabilities.

Referring now also to FIG. 6, presented is an embodiment of a system 600 that includes an active tag 602 configured to communicate with a mobile computing device 610 selectively via an NFC signal 616 or via a separate wireless connection, illustrated as Bluetooth signal 620. Although the wireless connection is illustrated as a direct Bluetooth wireless connection between the active tag 602 and the mobile computing device 610, the system 600 can be configured to use a WiFi-based connection such as the direct WiFi connection of FIG. 4 or the indirect WiFi connection of FIG. 5 as would be appreciated.

In the system 600, the active tag 602 receives an NFC signal 616 from the mobile computing device 610 on a first antenna 606, recovers the clock from the 13.56 MHz ($f_{in}$) NFC signal 616 via the integrated frequency reference 608, generates a reference clock 618, and transmits a Bluetooth signal 620 to the mobile computing device 610 via the second antenna 614, for example as similarly described above for FIG. 3. In this system 600, the active tag 602 also includes an NFC chip 612. The NFC chip 612 can selectively respond back to the mobile computing device 610 via an NFC signal 616.

In certain embodiments the NFC chip 612 responds back to the mobile computing device 610 when the active tag 602 has insufficient power for active functions. For example, the power source 604 for the active tag 602 may have insufficient power if a battery is low or energy harvesting structures may not have provided sufficient power to allow active functions by the active tag 602. In certain other embodiments the NFC chip 612 is enabled for certain communications with the mobile computing device 610. For example, for secure communications that involve passwords or personal data, the NFC chip 612 can communicate with the mobile computing device 610 directly, while other communications are routed to the mobile computing device via Bluetooth signals 620. As would be appreciated, the active tag 602 and mobile computing device 610 can be configured to use 2.4 GHz or 5 GHz or any other suitable wireless speeds or IEEE 802.11 protocols as described above for FIGS. 4 and 5 as would be understood in the art.

The values disclosed herein are not to be understood as being strictly limited to the exact numerical values recited. Instead, unless otherwise specified, each such dimension is intended to mean both the recited value and a functionally equivalent range surrounding that value. It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. An active radio frequency identification ("RFID") tag, comprising:
   an antenna configured to receive a first radio frequency signal;
   an integrated circuit (IC) electrically coupled to the antenna; and
   an integrated frequency reference configured to recover a clock signal from the first radio frequency signal received at the antenna; and
   generate from the recovered clock signal an internal reference clock as a second radio frequency signal that the active tag can use for transmitting data at the same frequency or a different frequency as the received RFID signal.

2. The active RFID tag of claim 1, wherein the integrated frequency reference is an internal frequency reference integrated into solid state circuitry of the RFID tag.

3. The active RFID tag of claim 1, wherein the first radio frequency signal is an Ultra High Frequency ("UHF") signal consisting of an RFID signal between 860 MHz and 960 MHz.

4. The active RFID tag of claim 1, wherein the second radio frequency signal is an Ultra High Frequency ("UHF") signal selected from the group consisting of an RFID signal between approximately 860 MHz and 960 MHz, a 2.4 GHz WiFi signal, a 2.45 GHz Bluetooth signal, and a 5 GHz WiFi signal.

5. The active RFID tag of claim 1, further comprising:
   a second antenna configured to transmit the data associated with the second radio frequency signal.

6. The active RFID tag of claim 1, wherein the integrated frequency reference is further configured to recover the recovered clock from one or more of a carrier signal associated with the first radio frequency signal or data associated with the first radio frequency signal.

7. The active RFID tag of claim 1, wherein the first radio frequency signal is a High Frequency ("HF") signal consisting of a 13.56 MHz Near Field Communication ("NFC") signal.

8. The active RFID tag of claim 7, wherein the RFID tag is configured to receive the first radio frequency signal from a NFC interface of a mobile computing device, and transmit the data associated with the second radio frequency signal to a Bluetooth interface of the mobile computing device.

9. The active RFID tag of claim 7, wherein the RFID tag is configured to receive the first radio frequency signal from a NFC interface of a mobile computing device, and transmit the data associated with the second radio frequency signal to a WiFi interface of the mobile computing device.

10. The active RFID tag of claim 9, wherein the WiFi interface of the mobile computing device is connected to a WiFi network, and wherein the RFID tag is configured to transmit the data to the WiFi network.

11. The active RFID tag of claim 7, wherein the first antenna is a coil antenna.

12. An active radio frequency identification ("RFID") tag, comprising:
   an antenna configured to receive a first radio frequency signal;
   an integrated circuit (IC) electrically coupled to the antenna; and
   an integrated frequency reference configured to recover a clock signal from the first radio frequency signal received at the antenna; and
   generate from the recovered clock signal an internal reference clock that the active tag can use for transmitting data at the same frequency or a second frequency as the first radio frequency signal; wherein the first radio frequency signal is a High Frequency ("HF") signal consisting of a 13.56 MHz Near Field Communication ("NFC") signal; wherein the antenna is a coil antenna and the active radio frequency identification tag is further comprising:
   a NFC chip in communication with the coil antenna and the RFID tag,
   wherein the NFC chip is configured to selectively send a response to the first radio frequency signal.

13. The active RFID tag of claim 12, wherein the NFC chip is configured to selectively send the response when the active RFID has insufficient power to transmit the data associated with the second radio frequency signal in response to the first radio frequency signal.

14. The active RFID tag of claim 12, wherein the NFC chip is configured to selectively send the response when the data associated with the second radio frequency signal includes private data.

15. A method, comprising:
   receiving, by an RFID chip of an active RFID tag, an interrogation signal from a RFID reader, wherein the RFID interrogation signal comprising a clock signal that is related to an internal accurate reference clock in the RFID reader;
   recovering the clock signal from the RFID interrogation signal generating from the recovered clock signal an internal reference clock; and
   transmitting, by the RFID chip and using a frequency associated with the generated reference clock, the response data.

16. A method, comprising:
   receiving, by an RFID chip of an active RFID tag, an interrogation signal from a RFID reader, wherein the RFID interrogation signal comprises a clock signal that is related to an internal accurate reference clock in the RFID reader;
   recovering the clock signal from the RFID interrogation signal generating from the recovered clock signal an internal reference clock; and transmitting, by the RFID chip and using a frequency associated with the generated reference clock, the response data, wherein the interrogation signal is a NFC signal received via a first antenna,
   wherein response data is selected from the group consisting of a Bluetooth beacon message and a WiFi message, and
   wherein the response data is transmitted via a second antenna.

17. The method of claim 16, further comprising:
   determining when the RFID chip has insufficient power to transmit the response data or the response data includes private data; and
   selectively transmitting, based on the determining operation and by an NFC chip associated with the first antenna and the RFID chip, the response data via a second NFC signal.

* * * * *